(12) United States Patent
Shao et al.

(10) Patent No.: US 11,989,008 B2
(45) Date of Patent: May 21, 2024

(54) METHODS AND INTERNET OF THINGS SYSTEMS FOR REGULATING RATED OUTLET PRESSURES OF GATE STATION COMPRESSORS FOR SMART GAS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Guanghua Huang, Chengdu (CN); Haitang Xiang, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/362,997

(22) Filed: Aug. 1, 2023

(65) Prior Publication Data

US 2023/0376010 A1 Nov. 23, 2023

Related U.S. Application Data

(63) Continuation of application No. 18/154,854, filed on Jan. 16, 2023, now Pat. No. 11,762,373.

(30) Foreign Application Priority Data

Nov. 28, 2022 (CN) .......................... 202211496057.6

(51) Int. Cl.
*G05B 19/416* (2006.01)
(52) U.S. Cl.
CPC .. *G05B 19/416* (2013.01); *G05B 2219/41108* (2013.01)

(58) Field of Classification Search
None
See application file for complete search history.

(56) References Cited

U.S. PATENT DOCUMENTS

| | | | |
|---|---|---|---|
| 6,293,766 | B1 | 9/2001 | Blotenberg |
| 2006/0009881 | A1 | 1/2006 | Ferber et al. |

(Continued)

FOREIGN PATENT DOCUMENTS

| | | |
|---|---|---|
| CN | 104100836 A | 10/2014 |
| CN | 110717632 A | 1/2020 |

(Continued)

OTHER PUBLICATIONS

Notification to Grant Patent Right for Invention in Chinese Application No. 202211496057.6 mailed on Feb. 17, 2023, 2 pages.
(Continued)

*Primary Examiner* — Ryan A Jarrett
(74) *Attorney, Agent, or Firm* — METIS IP LLC

(57) ABSTRACT

This present disclosure provides a method for regulating a rated outlet pressure of a gate station compressor for smart gas, which is implemented based on an Internet of Things system for regulating a rated outlet pressure of a gate station compressor for smart gas. The method includes: obtaining user features of a downstream gas usage based on the smart gas object platform, the user features including at least a user type and at least one of downstream flow prediction values of a plurality of future moments, wherein the downstream flow prediction values are obtained by a downstream flow prediction model based on a historical downstream flow sequence; obtaining operation parameters of a compressor, the operation parameters including at least a rated outlet pressure set by the compressor; and determining a rated outlet pressure adjustment amount of the compressor based on the user features and the operation parameters.

20 Claims, 6 Drawing Sheets

(56) References Cited

U.S. PATENT DOCUMENTS

| | | | |
|---|---|---|---|
| 2023/0012835 A1* | 1/2023 | Espie | F25J 3/04824 |
| 2023/0079768 A1 | 3/2023 | Shao et al. | |
| 2023/0125033 A1 | 4/2023 | Shao et al. | |
| 2023/0251628 A1* | 8/2023 | Idris | E21B 41/00 |
| | | | 700/266 |

FOREIGN PATENT DOCUMENTS

| | | | |
|---|---|---|---|
| CN | 115244271 A | 10/2022 | |
| RU | 2009121501 A | 12/2010 | |

OTHER PUBLICATIONS

First Office Action in Chinese Application No. 202211496057.6 mailed on Jan. 30, 2023, 11 pages.

\* cited by examiner

METHODS AND INTERNET OF THINGS SYSTEMS FOR REGULATING RATED OUTLET PRESSURES OF GATE STATION COMPRESSORS FOR SMART GAS

CROSS-REFERENCE TO RELATED APPLICATIONS

This application is a continuation of U.S. application Ser. No. 18/154,854, filed on Jan. 16, 2023, which claims priority of Chinese Patent Application No. 202211496057.6, filed on Nov. 28, 2022, the contents of each of which are hereby incorporated by reference.

TECHNICAL FIELD

The present disclosure relates to the technical field of gas management, and in particular to a method and a system for regulating a rated outlet pressure of a gate station compressor for smart gas.

BACKGROUND

The process of gas usage requires a gas gate station to process the gas. The gas gate station has functions of detection, filtration, metering, pressure regulation, heat tracing, odorization, distribution, remote telemetry/remote control, etc. The gas gate station regulates a gas pressure through a compressor. An operation cost of the compressor mainly includes a cost of gas and electricity consumed by the compressor, and a regulation cost of the compressor is high.

Therefore, it is expected to propose a method and an Internet of Things (IoT) system for regulating a rated outlet pressure of a gate station compressor for smart gas, which can optimize a rated outlet pressure adjustment amount of the compressor to reduce the regulation cost.

SUMMARY

One or more embodiments of this present disclosure provide a method for regulating a rated outlet pressure of a gate station compressor for smart gas. The method is implemented based on an Internet of Things system for regulating a rated outlet pressure of a gate station compressor for smart gas, the Internet of Things system includes a smart gas device management platform, a smart gas sensor network platform and a smart gas object platform interacting in sequence, and the method is executed by the smart gas device management platform, comprising: obtaining user features of a downstream gas usage based on the smart gas object platform, the user features including at least a user type and at least one of downstream flow prediction values of a plurality of future moments, wherein the downstream flow prediction values of the plurality of future moments are obtained by a downstream flow prediction model based on a historical downstream flow sequence, the downstream flow prediction model being a machine learning model; the downstream flow prediction model is obtained by training a plurality of first training samples with labels; and the first training samples include a sample historical downstream flow sequence, and the labels are downstream flow prediction values of a plurality of future moments corresponding to moments of the first training samples; obtaining operation parameters of a compressor based on the smart gas object platform, the operation parameters including at least a rated outlet pressure set by the compressor; and determining a rated outlet pressure adjustment amount of the compressor based on the user features and the operation parameters.

One or more embodiments of this disclosure provide an Internet of Things system for regulating a rated outlet pressure of a gate station compressor for smart gas. The Internet of Things system includes a smart gas device management platform, a smart gas sensor network platform, and a smart gas object platform interacting in sequence, and the smart gas device management platform is used to: obtain user features of a downstream gas usage based on the smart gas object platform, the user features including at least a user type and at least one of downstream flow prediction values of a plurality of future moments, wherein the downstream flow prediction values of the plurality of future moments are obtained by a downstream flow prediction model based on a historical downstream flow sequence, the downstream flow prediction model being a machine learning model; the downstream flow prediction model is obtained by training a plurality of first training samples with labels; and the first training samples include a sample historical downstream flow sequence, and the labels are downstream flow prediction values of a plurality of future moments corresponding to moments of the first training samples; obtain operation parameters of a compressor based on the smart gas object platform, the operation parameters including at least a rated outlet pressure set by the compressor; and determine a rated outlet pressure adjustment amount of the compressor based on the user features and the operation parameters.

One or more embodiments of the present disclosure provide a non-transitory computer-readable storage medium, comprising a set of instructions, wherein when executed by a processor, a method for regulating a rated outlet pressure of a gate station compressor for smart gas is implemented.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
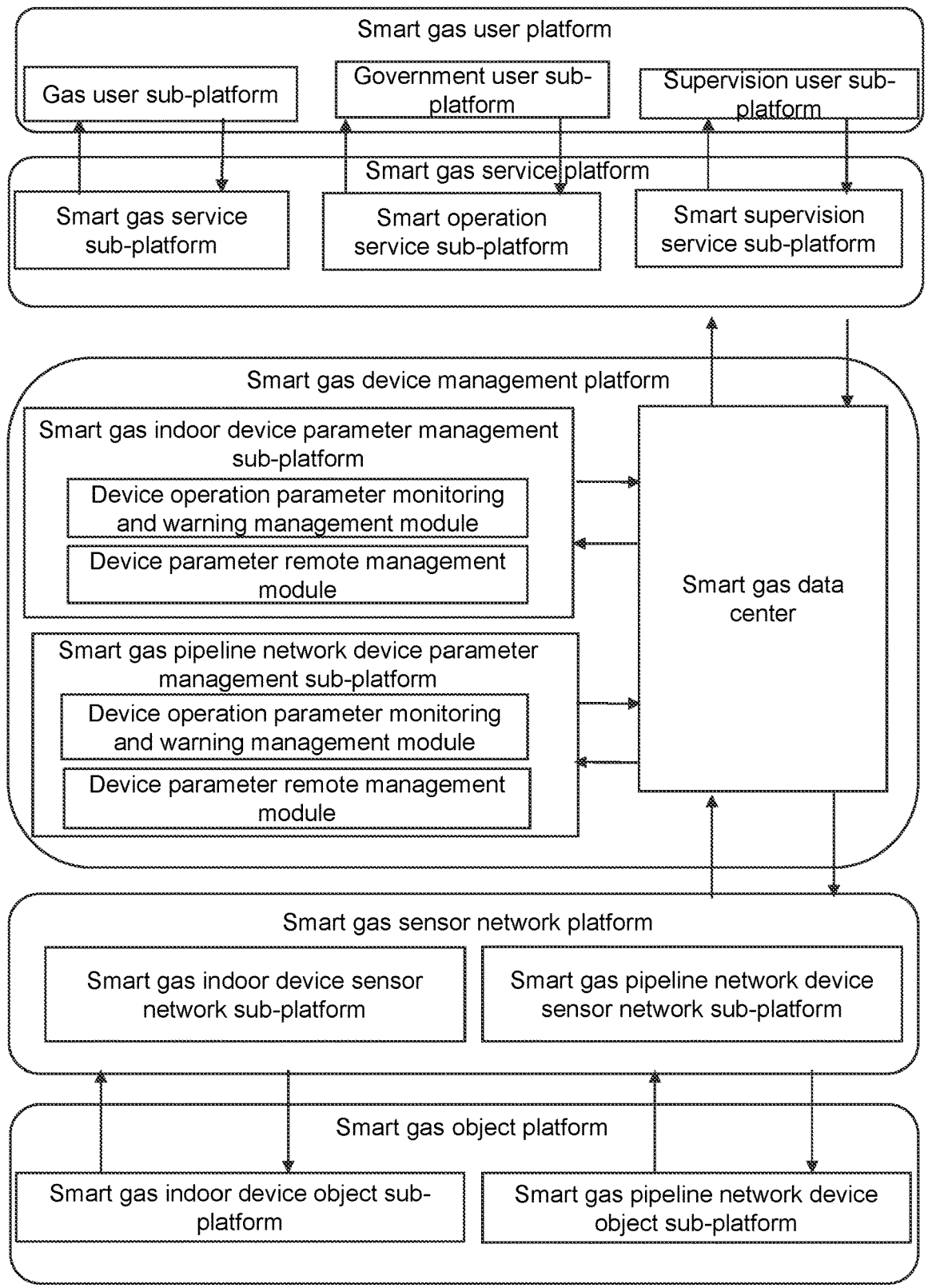
FIG. 1 is a schematic diagram illustrating a platform structure of an Internet of Things system for gate station compressor operation optimization for smart gas according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a schematic diagram illustrating a platform structure of an Internet of Things system 100 for gate station compressor operation optimization for smart gas according to some embodiments of the present disclosure.

As shown in FIG. 1, in some embodiments, the Internet of Things system 100 for gate station compressor operation optimization for smart gas may include a smart gas user platform, a smart gas service platform, a smart gas device management platform, a smart gas sensor network platform, and a smart gas object platform.

In some embodiments, a process of information in the Internet of Things system 100 may be divided into a process of perceptual information and a process of control information, and the control information may be information generated based on the perceptual information. The perceptual information may be obtained and transmitted to the smart gas device management platform by the smart gas user platform. The control information may be sent from the smart gas device management platform to the smart gas user platform to realize a corresponding control.

The smart gas user platform may be a platform used to interact with a user. In some embodiments, the smart gas user platform may be configured as a terminal device. For example, the terminal device may include a mobile device, a tablet computer, or the like, or any combination thereof. In some embodiments, the smart gas user platform may be used to provide feedback to the user on information related to the gas device, etc. In some embodiments, the smart gas user platform may be provided with a gas user sub-platform, a government user sub-platform, and a supervision user sub-platform. The gas user sub-platform may be oriented to a gas user and provide information related to the gas device. The gas user may be a user who uses gas. In some embodiments, the gas user sub-platform may correspond to and interact with a smart gas service sub-platform to obtain a service of safe gas usage. The government user sub-platform may be oriented to a government user and provide data related to a gas operation. The government user may be a user of a government department related to the gas operation. In some embodiments, the government user sub-platform may correspond to and interact with a smart operation service sub-platform to obtain a service of the gas operation. The supervision user sub-platform may be oriented to a supervision user and supervise an operation of the entire Internet of Things (IoT) system for gate station compressor operation optimization for smart gas. The supervision user may be a user of a security department. In some embodiments, the supervision user sub-platform may correspond to and interact with a smart supervision service sub-platform to obtain a service of safety supervision requirements. In some embodiments, the smart gas user platform may interact with the smart gas service platform downward in both directions. For example, a query instruction of management information of operation parameters of the gas station compressor may be sent to the smart gas service sub-platform by the gas user sub-platform, and the management information of the operation parameters of the gas station compressor uploaded by the smart operation service sub-platform may be received by the government user sub-platform.

The smart gas service platform may be a platform for receiving and transmitting data and/or information. For example, the smart gas service platform may send information related to the gas device to the smart gas user platform. In some implementations, the smart gas service platform may be provided with the smart gas service sub-platform, the smart operation service sub-platform, and the smart supervision service sub-platform. The smart gas service sub-platform may correspond to the gas user sub-platform and provide the gas user with information related to the gas device. The smart operation service sub-platform may correspond to the government user sub-platform and provide the government user with information related to the gas operation. The smart supervision service sub-platform may correspond to the supervision user sub-platform and provide the supervision user with information related to the safety supervision. In some embodiments, the smart gas service platform may interact downward with the smart gas device management platform. For example, a query instruction of management information of the operation parameters of the gas station compressor may be sent to a smart gas data center, and the management information of the operation parameters of the gas station compressor uploaded by the smart gas data center may be received by the smart gas service platform.

The smart gas device management platform may refer to a platform that harmonizes and coordinates the connection and collaboration among the functional platforms, converges all the information of the Internet of Things, and provides functions of perception management and control management for the Internet of Things operation system. For example, the smart gas device management platform may obtain operation parameters of the gas gate station compressor and operation data such as flow and pressure of a gas pipeline.

In some embodiments, the smart gas device management platform may be provided with a smart gas indoor device parameter management sub-platform, a smart gas pipeline network device parameter management sub-platform, and a smart gas data center. Each management sub-platform may interact with the smart gas data center in both directions. The smart gas data center summarizes and stores all operation data of the Internet of Things system, and each management sub-platform may obtain data from the smart gas data center and provide feedback on parameter management data of a corresponding device. For example, the smart gas pipeline network device parameter management sub-platform may interact with the smart gas data center in both directions, and the smart gas pipeline network device parameter management sub-platform may obtain data from the smart gas data center and provide the feedback on the parameter management data of the corresponding device. In some embodiments, the smart gas device management platform may interact information with the smart gas service platform and the smart gas sensor network platform through the smart gas data center. In some embodiments, the smart gas data center may receive data related to the gas gate station compressor operation uploaded by the sensor network platform. The data related to the gas gate station compressor operation may be sent to the smart gas network device parameter management sub-platform for analysis and processing. The aggregated, processed data may be then sent to the smart gas service platform. In some embodiments, the smart gas pipeline network device parameter management sub-platform for smart gas device management platform may be provided with a device operation parameter monitoring and warning management module and a device parameter remote management module.

The smart gas sensor network platform may be a functional platform for the management of sensor communications. The smart gas sensor network platform may be configured as a communication network and gateway for network management, protocol management, instruction management, and data parsing. In some embodiments, the smart gas sensor network platform may include a smart gas indoor device sensor network sub-platform corresponding to a smart gas indoor device object sub-platform and a smart gas pipeline network device sensor network sub-platform corresponding to a smart gas pipeline network device object sub-platform for obtaining data related to the indoor device and data related to the pipeline network device, respectively. In some embodiments, the smart gas sensor network platform may connect to the smart gas device management platform and the smart gas object platform to achieve functions of perceptual information sensor communication and control information sensor communication. For example, the smart gas sensor network platform may receive an instruction from the smart gas data center to obtain data related to the gas gate station compressor operation, and issue an instruction to the smart gas object platform to obtain data related to the gas gate station compressor operation.

The smart gas object platform may be a functional platform generated by the perceptual information. In some embodiments, the smart gas object platform may be also provided with the smart gas indoor device object sub-platform corresponding to the smart gas indoor device sensor network sub-platform and the smart gas pipeline network device object sub-platform corresponding to the smart gas pipeline network device sensor network sub-platform. The smart gas pipeline network device object sub-platform may include a gas gate station compressor, a gas flow meter, a valve control device, a thermometer, a barometer, etc. In some embodiments, the smart gas object platform may interact upwardly with the smart gas sensor network platform, receive the instruction from the smart gas sensor network sub-platform to obtain the data related to the gas gate station compressor operation, and upload the data related to the gas gate station compressor operation to the corresponding sensor network sub-platform, etc.

It should be noted that the smart gas user platform in this embodiment may be a desktop computer, tablet computer, laptop computer, cell phone, or other electronic devices capable of data processing and data communication, which will be not too limited here. It should be understood that the data processing referred to in this embodiment can be processed by a processor of a server, and the data stored in the server may also be stored in the storage device of the server, such as a hard disk and other storages. In specific applications, the smart gas sensor network platform may use a plurality of groups of gateway servers, or a plurality of groups of smart routers, which will be not too limited here. It should be understood that the data processing mentioned in this embodiment of the present disclosure can be processed by a processor of a gateway server, and any data stored in the gateway server may also be stored in the storage device of the gateway server, such as a hard disk, a solid state disk (SSD), and other storages.

In some embodiments of the present disclosure, the Internet of Things (IoT) functional architecture of five platforms is used to implement a method for gate station compressor operation optimization for smart gas, completing a closed loop of information flow and making the information processing of the Internet of Things more smooth and efficient.

Figure 2:
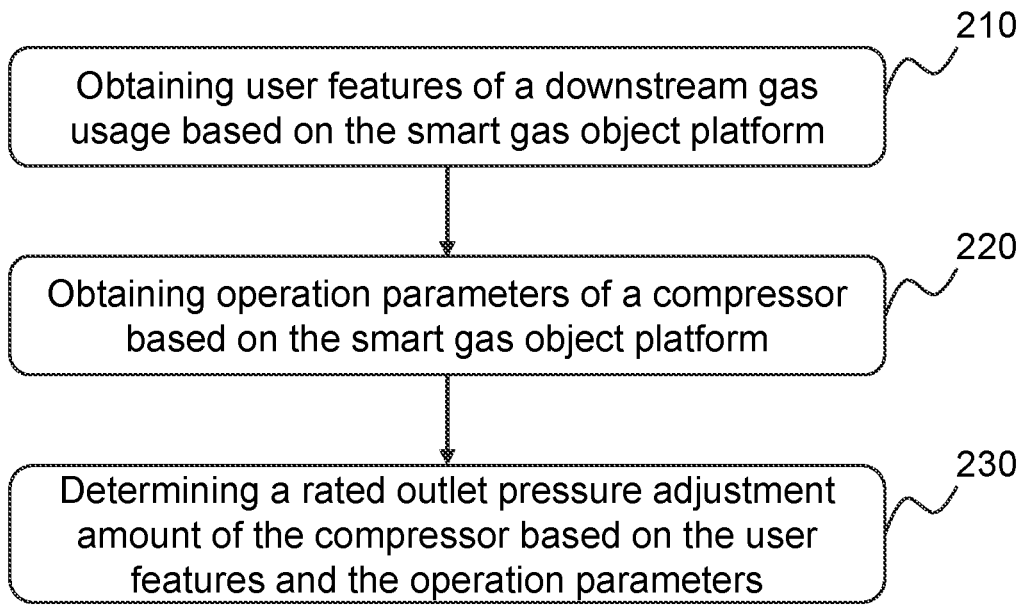
FIG. 2 is a flowchart illustrating an exemplary method for gate station compressor operation optimization for smart gas according to some embodiments of the present disclosure.

FIG. 2 is a flowchart illustrating an exemplary method for gate station compressor operation optimization for smart gas according to some embodiments of the present disclosure. As shown in FIG. 2, process 200 includes the following steps. In some embodiments, one or more operations of the process 200 shown in FIG. 2 may be implemented in the Internet of Things system 100 for gate station compressor operation optimization for smart gas shown in FIG. 1. In some embodiments, the process 200 may be performed by the smart gas device management platform.

Step 210, obtaining user features of a downstream gas usage based on the smart gas object platform.

The downstream may refer to a downstream end of a gas transmission process, for example, the downstream may refer to a gas user.

The user features may refer to information about the user. In some embodiments, the user features may include at least a user type.

The user type may refer to a corresponding type of the user. For example, the user type may include a city pipeline network user, a gas gate station user, etc. The city pipeline network user may include an industrial user, a residential user, etc.; the gas gate station user may be a receiving station where the gas enters the city pipeline network from a long-distance pipeline.

In some embodiments, the smart gas device management platform may obtain the user features through analysis of big data, third-party platforms, etc., wherein the third party platforms may include a government gas operation platform. For example, the smart gas device management platform may obtain a large amount of data through gas operator data, web crawling, etc., to obtain the user features after processing such as statistical analysis. As another example, the smart gas device management platform may obtain the user features after processing the data obtained through the government gas operation platform, etc.

In some embodiments, the user features may also include downstream flow prediction values of a plurality of future moments.

The plurality of future moments may refer to a plurality of time points after a current time. For example, if the current time is 08:00 on Jan. 1, 2025, then the plurality of future moments may refer to 09:00, 15:30 on Jan. 1, 2025, 06:00 on Jan. 2, 2025, etc.

The downstream flow prediction value may refer to a gas predicted flow of gas delivered to the downstream. For example, the downstream flow prediction value may be 20 $m^3/h$.

In some embodiments, the smart gas device management platform may obtain historical data through big data, third-party platforms, etc., and predict the downstream flow prediction value of the plurality of future moments. For example, the smart gas device management platform may use an average of historical gas flow at a same moment of a previous week corresponding to a certain future moment as the downstream flow prediction value of the future moment and thus obtain the downstream flow prediction value of the plurality of future moments.

In some embodiments, the smart gas device management platform may predict the downstream flow prediction value of the plurality of future moments through a downstream flow prediction model based on a historical downstream flow sequence. For more information about determining the downstream flow prediction value of the plurality of future moments through the downstream flow prediction model, please refer to FIG. 4 and related descriptions thereof.

Step 220, obtaining operation parameters of a compressor based on the smart gas object platform.

The compressor may refer to a device that compresses a gas medium in the gas gate station, for example, a direct-acting regulator, an indirect-acting regulator, etc.

The operation parameters may refer to parameter data related to an operation of a certain compressor or a multi-stage compressor considered as a whole. For example, the operation parameters may refer to an inlet pressure, a rated outlet pressure, a valve opening, etc. The inlet pressure may refer to a gas pressure at an inlet end of the compressor, and the valve opening may refer to a percentage of the valve opening degree.

In some embodiments, the operation parameters may include at least the rated outlet pressure set by the compressor. The rated outlet pressure may refer to a highest operation pressure of the downstream city gas pipeline network, for example, the rated outlet pressure may be 10 kPa.

In some embodiments, the operation parameters may be obtained through relevant preset parameters of the compressor, or through a manual measurement input, a sensor such as a manometer, etc.

Step 230, determining a rated outlet pressure adjustment amount of the compressor based on the user features and the operation parameters.

The rated outlet pressure adjustment amount may refer to a value of the adjustment made to the rated outlet pressure. For example, the rated outlet pressure adjustment amount may be to increase the rated outlet pressure by 1 kPa. In some embodiments, the rated outlet pressure adjustment amount may be a positive or negative value, a positive value indicating an increase in the rated outlet pressure, and a negative value indicating a decrease in the rated outlet pressure.

In some embodiments, the smart gas device management platform may determine the rated outlet pressure adjustment amount based on a first preset rule based on a gas usage condition of a downstream user at different time periods. The first preset rule may be set empirically. For example, the first preset rule may be that 11:00-13:00 and 17:00-19:00 are peak periods for gas usage with a rated outlet pressure adjustment amount of −a kPa; 09:00-11:00 and 14:00-16:00 are low peak periods for gas usage with a rated outlet pressure adjustment amount of +b kPa.

In some embodiments, the smart gas device management platform may predict real-time outlet pressure values of a plurality of future moments based on the user features and operation parameters; and determining the rated outlet pressure adjustment amount of the compressor based on the real-time outlet pressure values of the plurality of future moments. The real-time outlet pressure value may refer to a real-time outlet pressure of the compressor.

In some embodiments, the smart gas device management platform may obtain historical data through big data, third-party platforms, etc., and predict the real-time outlet pressure values of the plurality of future moments. For example, the smart gas device management platform may use an average of historical real-time outlet pressure values of same moments in almost a month corresponding to the plurality of future moments as the real-time outlet pressure values of the plurality of future moments.

In some embodiments, the smart gas device management platform may predict the real-time outlet pressure values of the plurality of future moments through an outlet pressure value prediction model based on the user features and the operation parameters. For more information about determining the real-time outlet pressure values of the plurality of future moments through the outlet pressure value prediction model, please refer to FIG. 4 and related descriptions thereof.

In some embodiments, the smart gas device management platform may determine the rated outlet pressure adjustment amount based on a second preset rule based on the real-time outlet pressure values of the plurality of future moments. The second preset rule may be set empirically. For example, the second preset rule may be that: if the real-time outlet pressure value h kPa is in a range of a kPa-b kPa and the rated outlet pressure needs to be c kPa, the rated outlet pressure adjustment amount is (h−c)kPa. As another example, the second preset rule may be that for a real-time outlet pressure value of a kPa, the rated outlet pressure needs to be d kPa, and the rated outlet pressure adjustment amount is (a−d) kPa.

In some embodiments of the present disclosure, the rated outlet pressure adjustment amount of the compressor may be further determined by predicting the real-time outlet pressure values of the plurality of future moments, which can make the determined rated outlet pressure adjustment amount of the compressor more accurately and in accordance with the real-time gas usage.

In some embodiments of the present disclosure, the rated outlet pressure adjustment amount of the compressor may be determined by obtaining the user features of the downstream gas usage and the operation parameters of the compressor, which can make the process of determining the rated outlet pressure adjustment amount more reasonable and accurate, so as to regulate the rated outlet pressure and ensure a normal usage of the user and a normal operation of the compressor.

Figure 3:
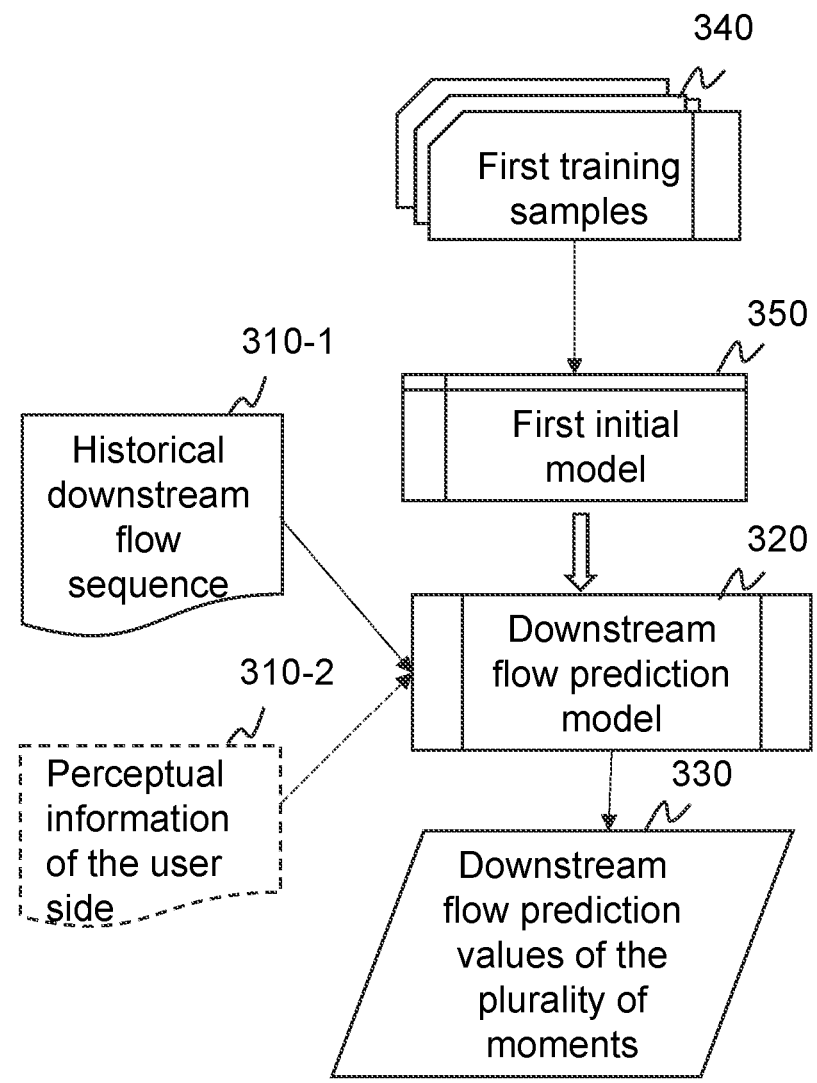
FIG. 3 is a schematic diagram illustrating an exemplary process for determining downstream flow prediction values of a plurality of future moments based on a downstream flow prediction model according to some embodiments of the present disclosure.

FIG. 3 is a schematic diagram illustrating an exemplary process 300 for determining downstream flow prediction values of a plurality of future moments based on a downstream flow prediction model according to some embodiments of the present disclosure.

In some embodiments, the smart gas device management platform may obtain the downstream flow prediction values of the plurality of future moments through a downstream flow prediction model 320 based on a historical downstream flow sequence.

In some embodiments, the downstream flow prediction model 320 may be used to predict the downstream flow prediction values of the plurality of future moments. The downstream flow prediction model 320 may be a machine learning model, for example, a Deep Neural Network (DNN) model, a Convolutional Neural Network (CNN) prediction model, a Recurrent Neural Network (RNN) model, or the like, or any combination thereof.

In some embodiments, as shown in FIG. 3, an input of the downstream flow prediction model 320 may include a historical downstream flow sequence 310-1. An output of the downstream flow prediction model 320 may include downstream flow prediction values 330 of the plurality of moments.

The historical downstream flow sequence 310-1 may refer to a sequence consisting of downstream flows corresponding to a plurality of time points within a certain history time period. For example, if the historical downstream flows of each day in a previous week at gate station A are 25000 $m^3/h$, 26000 $m^3/h$, 27000 $m^3/h$, 25000 $m^3/h$, 24000 $m^3/h$, 26000 $m^3/h$, 27000 $m^3/h$, the historical downstream flow sequence 310-1 may be [25000, 26000, 27000, 25000, 24000, 26000, 27000].

The downstream flow prediction value 330 of a plurality of moments may refer to a sequence consisting of downstream flow prediction value corresponding to a plurality of time points in a future time period. For example, the downstream flow prediction value for each day of the coming week at Gate A station is [26000, 26000, 25000, 25000, 23000, 24000, 25000].

In some embodiments, the input of the downstream flow prediction model 320 may also include perceptual information 310-2 of a user side.

The perceptual information 310-2 of the user side refers to gas usage information monitored by the user side. For example, a time when the gas is turned on or off, and a sequence of gas combustion temperatures monitored by the user side.

The downstream flow prediction values of the plurality of future moments may be determined by adding the perceptual information of the user side, which can take the relationship between the perceptual information of the user side and the downstream flow into account, and make determined downstream flow prediction values of the plurality of future moments more comprehensive and accurate.

In some embodiments, the downstream flow prediction model 320 may be obtained based on a plurality of training samples with labels. A plurality of first training samples 340 with labels may be input into a first initial model 350, a loss function may be constructed based on the labels and results of the first initial model 350, and parameters of the first initial model 350 may be updated iteratively based on the loss function. The model training may be completed when the loss function of the first initial model 350 meets a preset condition, and a trained downstream flow prediction model 320 may be obtained. The preset condition may be that the loss function converges, the count of iterations reaches a threshold, etc.

In some embodiments, the first training samples 340 may include a sample historical downstream flow sequence. The labels may be the downstream flow prediction values of the plurality of future moments corresponding to sample moments. The sample historical downstream flow sequence may be obtained based on the historical downstream flow sequence from historical data. The labels may be determined based on actual downstream flow values of the plurality of future moments corresponding to the sample moments in the historical data. The plurality of future moments may be moments in the historical data.

When the input of the downstream flow prediction model 320 includes the perceptual information 310-2 of the user side, the first training sample 340 may also include the perceptual information of the sample user side. The perceptual information of the sample user side may be obtained based on the perceptual information of the user side in the historical data.

In some embodiments of the present disclosure, the historical downstream flow sequence and the perceptual information of the user side may be processed through the downstream flow prediction model to more easily and accurately determine the downstream flow prediction values of the plurality of future moments.

Figure 4:
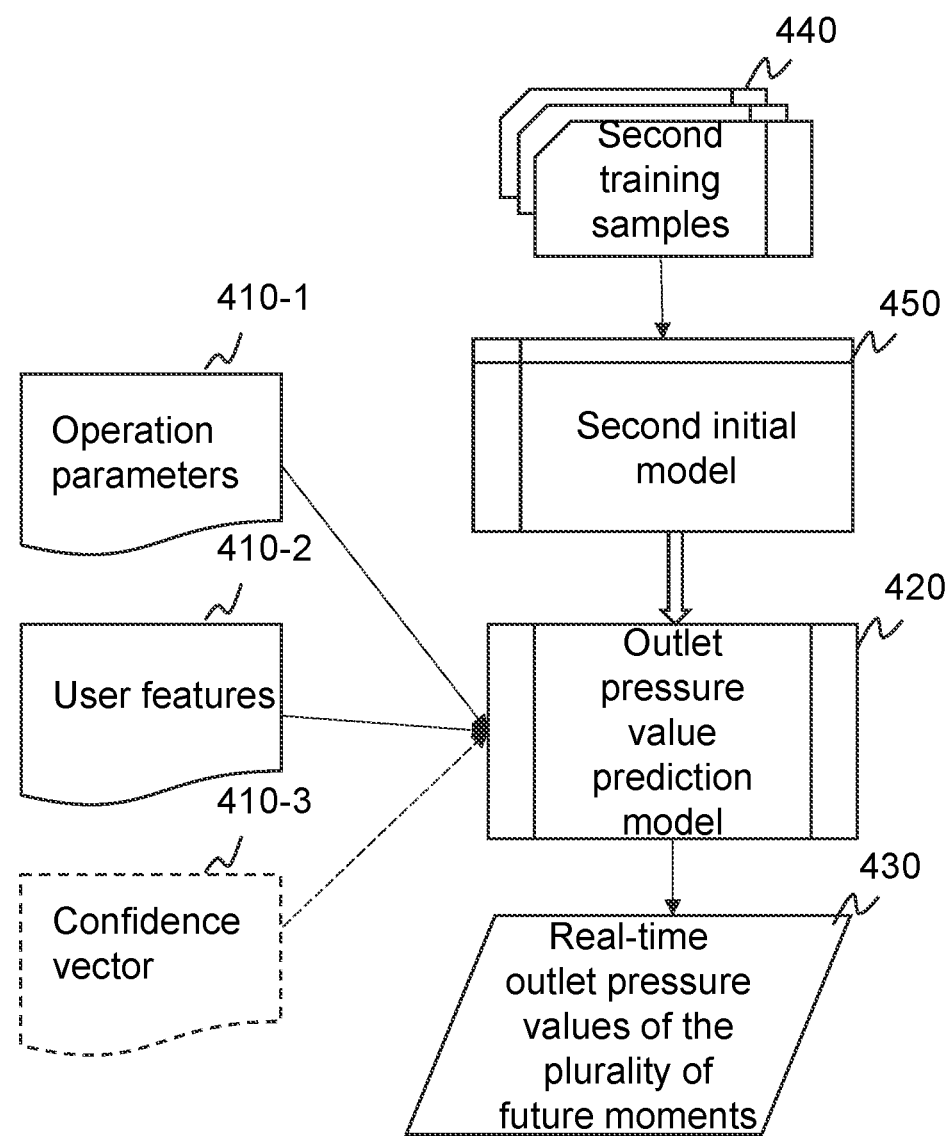
FIG. 4 is a schematic diagram illustrating an exemplary process for determining real-time outlet pressure values of a plurality of future moments based on an outlet pressure value prediction model according to some embodiments of the present disclosure.

FIG. 4 is a schematic diagram illustrating an exemplary process 400 for determining real-time outlet pressure values based on an outlet pressure value prediction model of a plurality of future moments according to some embodiments of the present disclosure.

In some embodiments, the smart gas device management platform may obtain real-time outlet pressure values of the plurality of future moments through an outlet pressure value prediction model 420 based on the user features and the operation parameters.

In some embodiments, the outlet pressure value prediction model 420 may be used to predict the real-time outlet pressure values of the plurality of future moments. The outlet pressure value prediction model 420 may be a machine learning model, for example, a DNN model, CNN model, RNN model, or the like. or any combination thereof.

In some embodiments, as shown in FIG. 4, the input of the outlet pressure value prediction model 420 may include operation parameters 410-1 and user features 410-2. The output of the outlet pressure value prediction model 420 may include real-time outlet pressure values 430 of the plurality of future moments. For example, the operation parameters 410-1 of gate station A may include an inlet pressure of 11 kPa, a rated outlet pressure of 10 kPa, and a valve opening of 90%, and the user features 410-2 may be a gas gate station user. The input of the outlet pressure value prediction model 420 may be [11, 10, 90%, a], wherein, a may represent the gas gate station user. The output of the outlet pressure value prediction model 420 may be a sequence consisting of real-time outlet pressure values for each day of a future week at gate station A of [200, 205, 198, 202, 200, 190, 210].

In some embodiments, the input of the outlet pressure value prediction model 420 may also include a confidence vector 410-3 when the user features include the downstream flow prediction values of the plurality of future moments.

The confidence vector 410-3 may refer to a vector consisting of a confidence level corresponding to each of the downstream flow prediction values of the plurality of moments. In some embodiments, the confidence vector 410-3 may be obtained based on the downstream flow prediction values of the plurality of moments of the output of the downstream flow prediction model. The order of the individual elements in the confidence vector 410-3 may correspond to the order of the moments corresponding to the sequence of the downstream flow prediction values of the plurality of moments.

In some embodiments, the further away from the current moment the future moment corresponding to the downstream flow prediction values of the plurality of moments, the lower the confidence level may be. For example, if the downstream flow prediction values for each day of the future week at gate station A is [26000, 26000, 25000, 25000, 23000, 24000, 25000], the sequence corresponds to a moment sequence from a nearest day to a farthest day away from the current moment. Since the further away from the current moment the future moment, the lower the confidence level may be, the confidence level corresponding to each of the downstream flow prediction values of a plurality of moments may be 85%, 83%, 80%, 76%, 75%, 72%, 70%, and the corresponding confidence vector 410-3 may be [85%, 83%, 80%, 76%, 75%, 72%, 70%].

The further away from the current moment the future moment corresponding to the downstream flow prediction values of the plurality of moments output by the downstream flow prediction model, the lower the influence on the real-time outlet pressure values of the plurality of future moments relatively, and the lower the confidence level may be. By adding the confidence vector to determine the real-time outlet pressure values of the plurality of future moments, the confidence levels corresponding to the downstream flow prediction values of the plurality of future moments can be taken into account, making the determined real-time outlet pressure values of the plurality of future moments more comprehensive and accurate.

In some embodiments, the outlet pressure value prediction model 420 may be obtained based on a plurality of training samples with labels. A plurality of second training samples 440 with labels may be input into a second initial model 450, and a loss function may be constructed based on the labels and results of the second initial model 450. The parameters of the second initial model 450 may be updated iteratively based on the loss function. The model training may be completed when the loss function of the second initial model 450 meets a preset condition, and the trained outlet pressure value prediction model 420 may be obtained. The preset condition may be that the loss function converges, the count of iterations reaches a threshold, etc.

In some embodiments, the second training sample 440 may include sample operation parameters and sample user features. The labels may be the real-time outlet pressure values of the plurality of future moments corresponding to the sample moments. The sample operation parameters and the sample user features may be obtained based on the operation parameters and user features in the historical data. The labels may be obtained based on the real-time outlet pressure values of the plurality of future moments corresponding to the sample moments in the historical data. The plurality of future moments may be the moments in the historical data.

When the input of the outlet pressure value prediction model 420 includes the confidence vectors 410-3, the second training sample 440 may also include the sample confidence vector. The sample confidence vector may be determined based on the order of the future moments from the sample moment corresponding to the downstream flow prediction values of the plurality of future moments corresponding to the sample moment in the historical data. The further away from the sample moment the future moment corresponding to the downstream flow prediction values of a plurality of future moments corresponding to the sample moment, the lower the confidence may be. The plurality of future moments may be the moments in the historical data.

In some embodiments of this present disclosure, the operation parameters, the user features and the confidence vector may be processed through the outlet pressure value prediction model 420, which significantly improve the accuracy of the obtained real-time outlet pressure values of the plurality of future moments.

Figure 5:
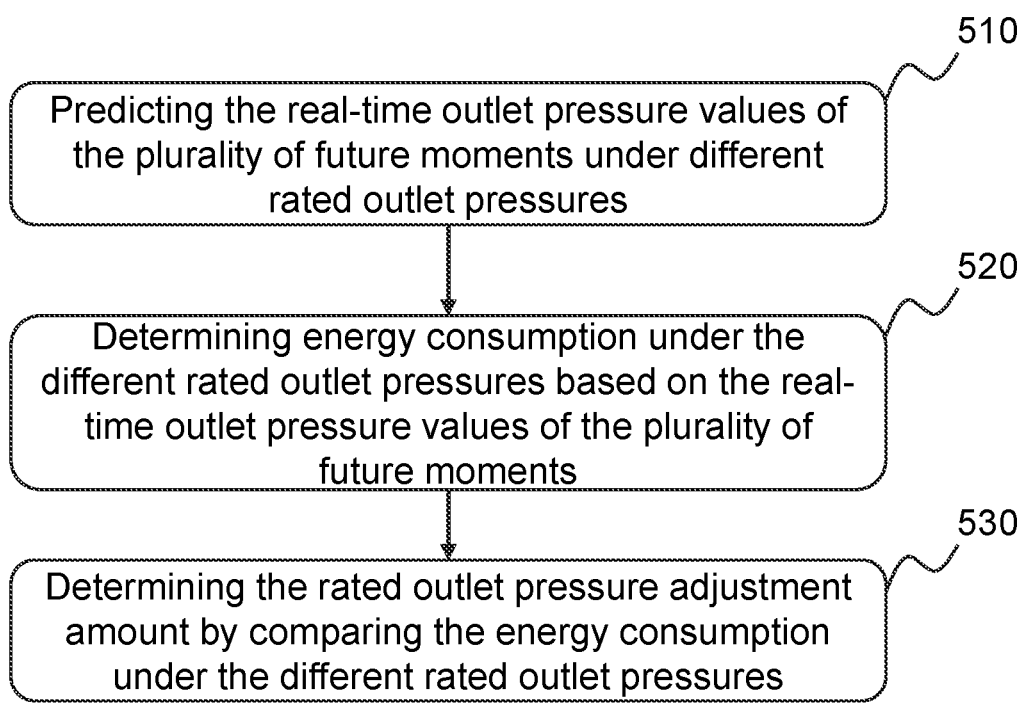
FIG. 5 is a flowchart illustrating an exemplary process for determining a rated outlet pressure adjustment amount of a compressor according to some embodiments of the present disclosure.

FIG. 5 is a flowchart illustrating an exemplary process 500 for determining a rated outlet pressure adjustment amount of a compressor according to some embodiments of the present disclosure. As shown in FIG. 5, process 500 may include the following steps. In some embodiments, one or more operations of the process 500 shown in FIG. 5 may be implemented in the Internet of Things system 100 for gate station compressor operation optimization for smart gas shown in FIG. 1. In some embodiments, the process 500 may be performed by the smart gas device management platform.

Step 510, predicting the real-time outlet pressure values of the plurality of future moments under different rated outlet pressures.

In some embodiments, the smart gas device management platform may predict the real-time outlet pressure values of the plurality of future moments under each of the different rated outlet pressures. For more information about predicting the real-time outlet pressure values of the plurality of future moments, please refer to FIG. 2 and related description thereof.

Step 520, determining energy consumption under the different rated outlet pressures based on the real-time outlet pressure values of the plurality of future moments.

The energy consumption may refer to a parameter that reflects the energy consumption condition of the compressor, for example, the energy consumption of the compressor may be electrical energy consumption of 2.5 kWh. In some embodiments, the energy consumption under different rated outlet pressures may include rated and fluctuating energy consumption.

The rated energy consumption may refer to energy consumption of the compressor to maintain a normal operation at the rated outlet pressure. For example, the energy consumption when the compressor maintains a rated outlet pressure of 10 kPa at all times.

The fluctuating energy consumption may refer to energy consumption spent to stabilize the real-time outlet pressure value of the compressor from a non-rated outlet pressure to the rated outlet pressure. For example, if the real-time outlet pressure of the compressor drops from the rated outlet pressure of 10 kPa to 9 kPa due to a steep increase in downstream flow, the fluctuating energy consumption may be the energy consumption spent to adjust the real-time outlet pressure from 9 kPa back to 10 kPa by an internal adjustment of the compressor.

In some embodiments, the smart gas device management platform may obtain the rated energy consumption by calculating the relevant preset parameters of the compressor.

In some embodiments, the smart gas device management platform may obtain historical data and determine the fluctuating energy consumption under different rated outlet pressures through a storage device inside or outside of the Internet of Things system 100 for gate station compressor operation optimization for smart gas. For example, the smart gas device management platform may use an average of historical fluctuating energy consumption under different rated outlet pressures from the historical data as the fluctuating energy consumption under different rated outlet pressures.

In some embodiments, the smart gas device management platform may predict the fluctuating energy consumption through an energy consumption prediction model based on the rated outlet pressure and real-time outlet pressure values. For more information about determining the fluctuating energy consumption through an energy consumption prediction model, please refer to FIG. 6 and related descriptions thereof.

Step 530, determining the rated outlet pressure adjustment amount by comparing the energy consumption under the different rated outlet pressures.

In some embodiments, the smart gas device management platform may compare the energy consumption under different rated outlet pressures and use a difference between a rated outlet pressure with a lowest energy consumption and a current rated outlet pressure as the rated outlet pressure adjustment amount. For example, the current rated outlet pressure is set to 200 kPa, and the energy consumption is 10 kWh, 12 kWh, and 9 kWh for rated outlet pressures of 190 kPa, 200 kPa, and 210 kPa, respectively. The smart gas device management platform may obtain the rated outlet pressure of 210 kPa with the lowest energy consumption, thereby calculating the rated outlet pressure adjustment amount of +10 kPa.

In some embodiments, the smart gas device management platform may determine fluctuating features under the different rated outlet pressures based on the real-time outlet pressure values of the plurality of future moments; determine evaluation values under the different rated outlet pressures based on the energy consumption under the different rated outlet pressures and the fluctuating features under the different rated outlet pressures; and determining the rated outlet pressure adjustment amount by comparing the evaluation values under the different rated outlet pressures.

The fluctuating features may refer to the information related to a fluctuation of the real-time outlet pressure value compared to the rated outlet pressure. For example, the fluctuating features may be fluctuating amplitude, fluctuating frequency, etc. The fluctuating amplitude may refer to an amplitude of the fluctuation of the real-time outlet pressure value compared to the rated outlet pressure. For example, if the rated outlet pressure is 200 kPa and the real-time outlet pressure value is 205 kPa, the fluctuating amplitude is 5 kPa. The fluctuating frequency may refer to a ratio of a count of real-time outlet pressure values that fluctuate from the rated outlet pressure to a total count of the real-time outlet pressure values among the plurality of real-time outlet pressure values. For example, if the count of the real-time outlet pressure values that fluctuate from the rated outlet pressure is 3 among 5 real-time outlet pressure values of future moments, the fluctuating frequency is 60%.

In some embodiments, the smart gas device management platform may determine the fluctuating features under different rated outlet pressures directly through calculations. For example, if the current rated outlet pressure is 200 kPa, the 5 predicted real-time outlet pressure values of future moments are: 200 kPa, 205 kPa, 200 kPa, 195 kPa, and 200 kPa. Two real-time outlet pressure values fluctuate, and the smart gas device management platform may calculate the fluctuating amplitude as (5+5)/2 kPa, i.e., 5 kPa, with a fluctuating frequency of 40%.

The evaluation value may refer to a relevant parameter used to evaluate superiority or inferiority of different rated outlet pressures. The evaluated value may be positively correlated with the superiority or inferiority of the different rated outlet pressure values. That is, the better the combined effect of the corresponding rated outlet pressure adjustment amount determined according to the different rated outlet pressures, the greater the evaluation value under the rated outlet pressure may be. In some embodiments, the evaluation value may be expressed in numbers such as 0-1 or words such as "excellent" or "fair", where the larger the number, the more excellent the evaluation value may be.

In some embodiments, the smart gas device management platform may determine the evaluation value by a formula method. For example, the smart gas device management platform may determine the evaluation value under different rated outlet pressures based on the evaluation value calculation formula (1):

$$\left(\frac{k_1}{a}\right) + \left(\frac{k_2}{b}\right) + \left(\frac{k_3}{c}\right) \quad (1)$$

where a, b, and c denote energy consumption, fluctuating amplitude, and fluctuating frequency, respectively, and k1, k2, and k3 are preset parameters that may be set based on experience or historical data.

In some embodiments, the smart gas device management platform may determine the evaluation values under different rated outlet pressures by performing a weighted calculation on the energy consumption under the different rated outlet pressures and the fluctuating features under different rated outlet pressures, weights of the weighted calculation being determined based on a gas combustion temperature sequence and a pressure resistance of the downstream pipeline in perceptual information of a user side.

The pressure resistance of the downstream pipeline may refer to a maximum pressure that the downstream pipeline may carry, for example, the pressure resistance of the downstream pipeline may be 0.5 MPa. For more information about the perceptual information of the user side, please refer to FIG. 3 and related descriptions thereof.

The smart gas device management platform may set a greater weight corresponding to the fluctuating features based on a rule that the more unstable the gas combustion temperature sequence, the greater the pressure resistance of the downstream pipeline may be. The stability of the gas combustion temperature sequence may be expressed by a standard deviation of a plurality of gas combustion temperatures, and the standard deviation formula (2) is:

$$S = \sqrt{\frac{\sum_{i=1}^{n}(x_i - 2)^2}{n-1}} \quad (2)$$

where s denotes the standard deviation, n denotes a count of gas combustion temperatures, $x_i$ denotes the ith gas combustion temperature, and x denotes an average of n gas combustion temperatures. The larger the standard deviation, the more unstable the gas combustion temperature sequence may be and the larger the weight corresponding to the fluctuating features may be. In some embodiments, the weights may be $k_1, k_2, k_3$ as in the previous embodiment, or may be newly added coefficients, and the exact values may be set empirically.

In some embodiments of the present disclosure, the smart gas device management platform determines the evaluation values by performing a weighted calculation on the energy consumption and fluctuating features under different rated outlet pressures and determining the weights for the efficiency gas combustion temperature sequence and the pressure resistance of the downstream pipeline, which can make the determination of the evaluation value more accurate while improving the computing efficiency.

In some embodiments, the smart gas device management platform may compare the evaluation values under different rated outlet pressures, select the rated outlet pressure with a largest evaluation value, and calculate the difference between that rated outlet pressure and the current rated outlet pressure as the rated outlet pressure adjustment amount. For example, if the current rated outlet pressure is 200 kPa, rated outlet pressure 1 is 205 kPa with an evaluation value of 0.8, and rated outlet pressure 2 is 210 kPa with an evaluation value of 0.5, the smart gas device management platform may calculate the difference of +5 kPa between rated outlet pressure 1 and the current rated outlet pressure as the rated outlet pressure adjustment amount.

In some embodiments of the present disclosure, the smart gas device management platform may determine the evaluation values and the rated outlet pressure adjustment amount by using the energy consumption and the fluctuating features under different rated outlet pressures, which can take the influence of several influencing factors on the rated outlet pressure adjustment amount into account at the same time to determine a more accurate rated outlet pressure adjustment amount that is more in line with the actual usage condition of the user.

In some embodiments of the present disclosure, the smart gas device management platform may determine the energy consumption under different rated outlet pressures by predicting the real-time outlet pressure values of the plurality of future moments and thus determine the rated outlet pressure adjustment amount, which can make the process of determining the rated outlet pressure adjustment amount more accurate and efficient, which is conducive to ensuring a good gas usage experience for the user, reducing the probability of gas leakage and fires occurring due to overpressure in the pipeline, and reducing operating costs of gas and electricity consumed by the compressor.

Figure 6:
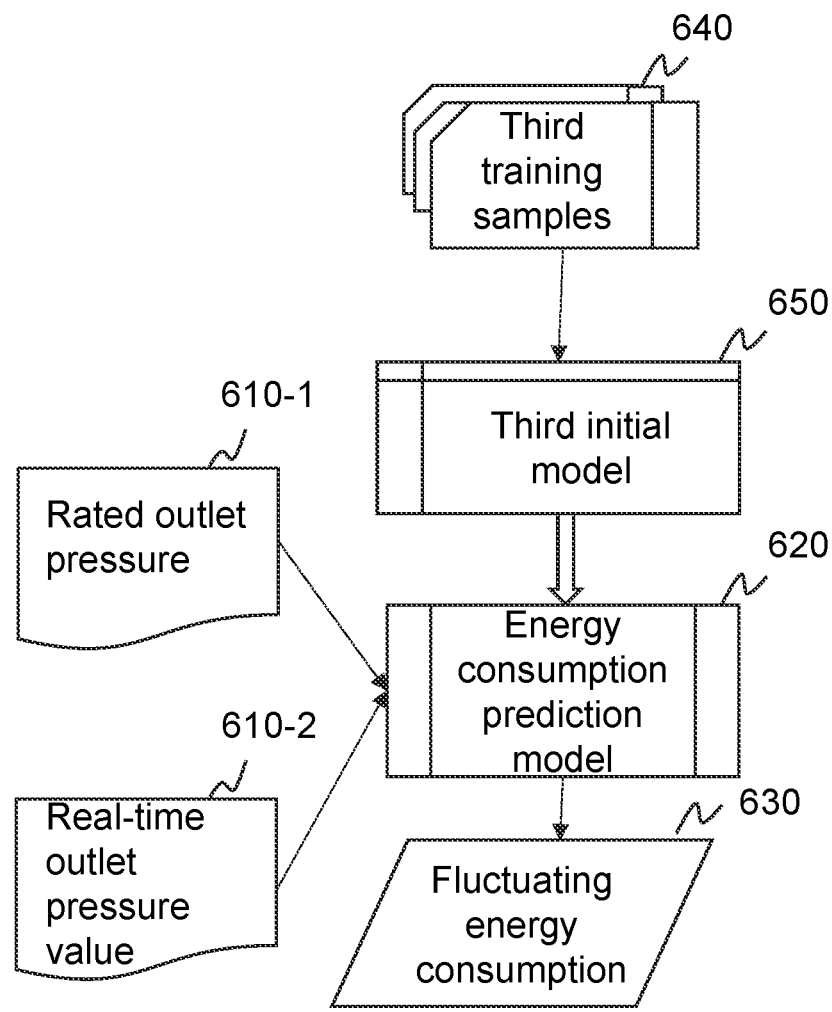
FIG. 6 is a schematic diagram illustrating an exemplary process for determining a fluctuating energy consumption

FIG. 6 is a schematic diagram illustrating an exemplary process 600 for determining a fluctuating energy consumption based on an energy consumption prediction model according to some embodiments of the present disclosure.

In some embodiments, the corresponding fluctuating energy consumption may be obtained by the energy consumption prediction model 620 based on the rated outlet pressure and the real-time outlet pressure values.

In some embodiments, the energy consumption prediction model 620 may be used to predict the fluctuating energy consumption. The energy consumption prediction model 620 may be a machine learning model, for example, a DNN model, CNN model, RNN model, or the like, or any combination thereof.

In some embodiments, as shown in FIG. 6, the input of the energy consumption prediction model 620 may include a rated outlet pressure 610-1 and a real-time outlet pressure value 610-2. The output of the energy consumption prediction model 620 may include a fluctuating energy consumption 630. For example, if the rated outlet pressure 610-1 at gate station A is 200 kPa and the real-time outlet pressure value 610-2 at gate station A is 205 kPa, the input of the energy consumption prediction model 620 may be [200, 205]. The output of the energy consumption prediction model 620 may be a fluctuating energy consumption 630 of 10,000 kW·h.

In some embodiments, the energy consumption prediction model 620 may be obtained based on a plurality of training samples with labels. The plurality of third training samples 640 with labels may be input into a third initial model 650, a loss function may be constructed based on the labels and results of the third initial model 650, and the parameters of the third initial model 650 may be updated iteratively based on the loss function. The model training may be completed when the loss function of the third initial model 650 meets a preset condition, and the trained energy consumption prediction model 620 may be obtained. The preset condition may be that the loss function converges, the count of iterations reaches a threshold, etc.

In some embodiments, the third training sample 640 may include a sample rated outlet pressure and sample real-time outlet pressure values. The labels may be sample fluctuating energy consumption. The sample rated outlet pressure and sample real-time outlet pressure values may be obtained based on the rated outlet pressure and real-time outlet pressure values in the historical data. The labels may be obtained based on the fluctuating energy consumption in the historical data.

In some embodiments of the present disclosure, the rated outlet pressure and real-time outlet pressure values may be processed by the energy consumption prediction model to accurately predict the corresponding fluctuating energy consumption.

The present disclosure provides a non-transitory computer-readable storage medium, comprising a set of instructions, wherein when executed by a processor, a method for gate station compressor operation optimization for smart gas may be implemented.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for regulating a rated outlet pressure of a gate station compressor for smart gas, wherein the method is implemented based on an Internet of Things system for regulating a rated outlet pressure of a gate station compressor for smart gas, the Internet of Things system includes a smart gas device management platform, a smart gas sensor network platform, and a smart gas object platform interacting in sequence, and the method is executed by the smart gas device management platform, comprising:
   obtaining user features of a downstream gas usage based on the smart gas object platform, the user features including at least a user type and at least one of downstream flow prediction values of a plurality of future moments, wherein the downstream flow prediction values of the plurality of future moments are obtained by a downstream flow prediction model based on a historical downstream flow sequence, the downstream flow prediction model being a machine learning model; the downstream flow prediction model is obtained by training a plurality of first training samples with labels; and the first training samples include a sample historical downstream flow sequence, and the labels are downstream flow prediction values of a plurality of future moments corresponding to moments of the first training samples;
   obtaining operation parameters of a compressor based on the smart gas object platform, the operation parameters including at least a rated outlet pressure set by the compressor; and
   determining a rated outlet pressure adjustment amount of the compressor based on the user features and the operation parameters.

2. The method of claim 1, wherein the smart gas device management platform includes a smart gas pipeline network device parameter management sub-platform and a smart gas data center, wherein the smart gas pipeline network device parameter management sub-platform interacts with the smart gas data center in both directions, and the smart gas pipeline network device parameter management sub-platform obtains data from the smart gas data center and feeds back corresponding device parameter management data;
   the smart gas object platform includes a smart gas indoor device object sub-platform and a smart gas pipeline network device object sub-platform, wherein the smart gas indoor device object sub-platform corresponds to an indoor gas device, and the smart gas pipeline network device object sub-platform corresponds to a pipeline network gas device; and
   the smart gas sensor network platform includes a smart gas indoor device sensor network sub-platform and a smart gas pipeline network device sensor network sub-platform, wherein the smart gas indoor device sensor network sub-platform corresponds to the smart gas indoor device object sub-platform, and the smart gas pipeline network device sensor network sub-platform corresponds to the smart gas pipeline network device object sub-platform.

3. The method of claim 1, wherein an input of the downstream flow prediction model further includes perceptual information of a user side.

4. The method of claim 1, wherein the determining a rated outlet pressure adjustment amount of the compressor based on the user features and the operation parameters includes:
   predicting real-time outlet pressure values of a plurality of future moments based on the user features and the operation parameters; and
   determining a rated outlet pressure adjustment amount of the compressor based on the real-time outlet pressure values of the plurality of future moments.

5. The method of claim 4, wherein the real-time outlet pressure values of the plurality of future moments are obtained by an outlet pressure value prediction model based on the user features and the operation parameters, the outlet pressure value prediction model being a machine learning model.

6. The method of claim 4, wherein the user features include downstream flow prediction values of a plurality of future moments, an input of an outlet pressure value prediction model further including a confidence vector, the confidence vector being related to the downstream flow prediction values of the plurality of future moments.

7. The method of claim 4, wherein the determining a rated outlet pressure adjustment amount of the compressor based on the real-time outlet pressure values of the plurality of future moments includes:
predicting the real-time outlet pressure values of the plurality of future moments under different rated outlet pressures;
determining energy consumption under the different rated outlet pressures based on the real-time outlet pressure values of the plurality of future moments, the energy consumption under the different rated outlet pressures including rated energy consumption and fluctuating energy consumption; and
determining the rated outlet pressure adjustment amount by comparing the energy consumption under the different rated outlet pressures.

8. The method of claim 7, wherein the fluctuating energy consumption is obtained by an energy consumption prediction model based on the rated outlet pressure and the real-time outlet pressure values, the energy consumption prediction model being a machine learning model.

9. The method of claim 7, wherein the determining the rated outlet pressure adjustment amount by comparing the energy consumption at the different rated outlet pressures includes:
determining fluctuating features under the different rated outlet pressures based on the real-time outlet pressure value of the plurality of future moments;
determining evaluation values under the different rated outlet pressures based on the energy consumption under the different rated outlet pressures and the fluctuating features under the different rated outlet pressures; and
determining the rated outlet pressure adjustment amount by comparing the evaluation values under the different rated outlet pressures.

10. The method of claim 9, wherein the determining evaluation values under the different rated outlet pressures based on the energy consumption under the different rated outlet pressures and the fluctuating features under the different rated outlet pressures includes:
determining the evaluation values under the different rated outlet pressures by performing a weighted calculation on the energy consumption under the different rated outlet pressures and the fluctuating features under the different rated outlet pressures, weights of the weighted calculation being determined based on a gas combustion temperature sequence and a pressure resistance of a downstream pipeline in perceptual information of a user side.

11. An Internet of Things system for regulating a rated outlet pressure of a gate station compressor for smart gas, wherein the Internet of Things system includes a smart gas device management platform, a smart gas sensor network platform and a smart gas object platform interacting in sequence, and the smart gas device management platform is used to:
obtain user features of a downstream gas usage based on the smart gas object platform, the user features including at least a user type and at least one of downstream flow prediction values of a plurality of future moments, wherein the downstream flow prediction values of the plurality of future moments are obtained by a downstream flow prediction model based on a historical downstream flow sequence, the downstream flow prediction model being a machine learning model; the downstream flow prediction model is obtained by training a plurality of first training samples with labels; and the first training samples include a sample historical downstream flow sequence, and the labels are downstream flow prediction values of a plurality of future moments corresponding to moments of the first training samples;
obtain operation parameters of a compressor based on the smart gas object platform, the operation parameters including at least a rated outlet pressure set by the compressor; and
determine a rated outlet pressure adjustment amount of the compressor based on the user features and the operation parameters.

12. The Internet of Things system of claim 11, wherein the smart gas device management platform includes a smart gas pipeline network device parameter management sub-platform and a smart gas data center, wherein the smart gas pipeline network device parameter management sub-platform interacts with the smart gas data center in both directions, and the smart gas pipeline network device parameter management sub-platform obtains data from the smart gas data center and feeds back corresponding device parameter management data;
the smart gas object platform includes a smart gas indoor device object sub-platform and a smart gas pipeline network device object sub-platform, wherein the smart gas indoor device object sub-platform corresponds to an indoor gas device and the smart gas pipeline network device object sub-platform corresponds to a pipeline network gas device; and
the smart gas sensor network platform includes a smart gas indoor device sensor network sub-platform and a smart gas pipeline network device sensor network sub-platform, wherein the smart gas indoor device sensor network sub-platform corresponds to the smart gas indoor device object sub-platform and the smart gas pipeline network device sensor network sub-platform corresponds to the smart gas pipeline network device object sub-platform.

13. The Internet of Things system of claim 11, wherein an input of the downstream flow prediction model further includes perceptual information of a user side.

14. The Internet of Things system of claim 11, wherein the smart gas device management platform is further used to:
predict real-time outlet pressure values of a plurality of future moments based on the user features and the operation parameters; and
determine a rated outlet pressure adjustment amount of the compressor based on the real-time outlet pressure values of the plurality of future moments.

15. The Internet of Things system of claim 14, wherein the smart gas device management platform is further used to:
obtain the real-time outlet pressure values of the plurality of future moments by an outlet pressure value prediction model based on the user features and the operation parameters, the outlet pressure value prediction model being a machine learning model.

16. The Internet of Things system of claim 14, wherein the user features include downstream flow prediction values of a plurality of future moments, an input of an outlet pressure value prediction model further including a confidence vector, the confidence vector being related to the downstream flow prediction values of the plurality of future moments.

17. The Internet of Things system of claim 14, wherein the smart gas device management platform is further used to:
    predict the real-time outlet pressure values of the plurality of future moments under different rated outlet pressures;
    determine energy consumption under the different rated outlet pressures based on the real-time outlet pressure values of the plurality of future moments, the energy consumption under the different rated outlet pressures including rated energy consumption and fluctuating energy consumption; and
    determine the rated outlet pressure adjustment amount by comparing the energy consumption under the different rated outlet pressures.

18. The Internet of Things system of claim 17, wherein the smart gas device management platform is further used to:
    obtain the fluctuating energy consumption by an energy consumption prediction model based on the rated outlet pressure and the real-time outlet pressure values, the energy consumption prediction model being a machine learning model.

19. The Internet of Things system of claim 17, wherein the smart gas device management platform is further used to:
    determine fluctuating features under the different rated outlet pressures based on the real-time outlet pressure value of the plurality of future moments;
    determine evaluation values under the different rated outlet pressures based on the energy consumption under the different rated outlet pressures and the fluctuating features under the different rated outlet pressures; and
    determine the rated outlet pressure adjustment amount by comparing the evaluation values under the different rated outlet pressures.

20. A non-transitory computer-readable storage medium, comprising a set of instructions, wherein when executed by a processor, a method as claimed in claim 1 is implemented.

* * * * *